Sept. 7, 1965 J. V. BARNES 3,204,729
NON-HELICAL SPRING FOR INTERNAL SHOE BRAKES
Filed Oct. 25, 1963 2 Sheets-Sheet 1
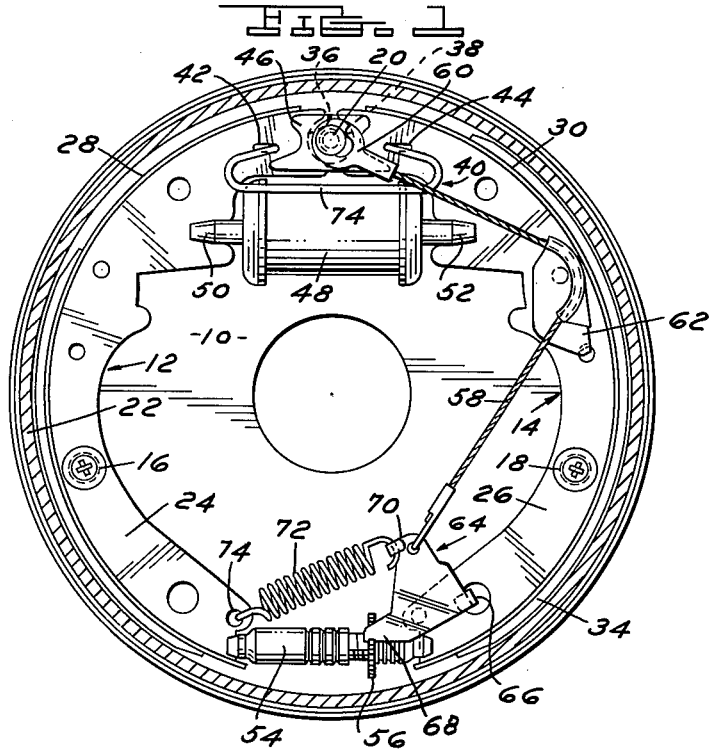
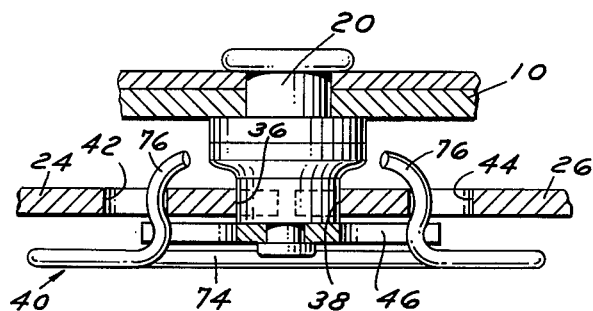
JOHN V. BARNES
INVENTOR.
BY John R. Faulkner
Clifford L. Sadley
ATTORNEYS Sept. 7, 1965        J. V. BARNES        3,204,729
NON-HELICAL SPRING FOR INTERNAL SHOE BRAKES
Filed Oct. 25, 1963        2 Sheets-Sheet 2

INVENTOR.
JOHN V. BARNES
BY John R. Faulkner,
Clifford L. Sadler
ATTORNEYS

United States Patent Office 3,204,729
Patented Sept. 7, 1965

3,204,729
NON-HELICAL SPRING FOR INTERNAL SHOE BRAKES
John V. Barnes, Detroit, Mich., assignor to Ford Motor Company, Dearborn, Mich., a corporation of Delaware
Filed Oct. 25, 1963, Ser. No. 318,981
11 Claims. (Cl. 188—216)

The present invention relates to an improved construction for internal shoe brakes.

While this invention is of interest in connection with internal shoe brakes generally, it has particular application to duo-servo brakes of the automatic adjuster type such as disclosed in FIGURE 3 of Patent 2,938,610. A duo-servo brake is usually characterized by its having a pair of brake shoes that engage a stationary anchor pin at their upper ends and trap a floating link between their lower ends. Steady rest springs position the shoes with respect to the brake backing plate to which the anchor pin is secured. A coil spring is interposed between the lower ends of the brake shoes to keep them in engagement with the floating link. The floating link is usually a two- or three-piece threaded device that may be extended to control the separation of the lower shoe ends and to thereby permit compensation for brake lining wear.

A spring is interposed between the anchor pin and each of the shoes in order to pull the upper ends into contact with the pin. These upper springs are often referred to as retractor springs. They extend diagonally from the anchor pin and engage the web of the shoes at a point approximately 60° angularly displaced from the anchor pin. Not only does this construction hold the upper ends of the brake shoes in engagement with the anchor pin, but unfortunately, it also imposes a couple that tends to lift the shoes off of the backing plate.

An automatic adjuster may be fitted to a duo-servo brake. Reference is made to Patent 2,938,610, FIGURE 3, for a complete disclosure of a brake construction of that type. Briefly, the automatic brake adjustment should be initiated when the secondary shoe is moved away from the anchor pin. This should occur only during reverse braking. When the brake is acuated by the hydraulic wheel cylinder, proper operation calls for the primary shoe to move away from the anchor pin first. To achieve this sequence requires a proper balance of forces between the two upper retractor springs and the lower spring. In order to obtain the necessary balance, the springs must be manufactured in accordance with close tolerances. If the shoes do not move in the proper sequence, adjustment may occur during forward rotation and this could result in overadjustment upon severe braking.

In view of the shortcomings of the prior art, it is one of the principal objects of the present invention to provide a unique brake construction having a novel single retractor spring interposed between the upper ends of the brake shoes. This novel construction not only improves the operation of conventional duo-servo brakes, but assures the proper sequence of operation of duo-servo brakes that are equipped with automatic adjusters. Due to the simplified construction, economic savings may be realized.

It is a further object of this invention to provide a unique brake retractor spring formed from wire. The unique wire spring is characterized by a load-deflection curve in which a high load is required for initial deflection. Further deflection requires only a nominal increase in load.

It is still a further object of this invention to provide an internal shoe brake with a unique brake retractor spring interposed between two adjacent ends of the brake shoes. The spring is arranged and adapted to exert a holding force upon the shoes that is substantially in the same plane as the shoe webs.

The many objects and advantages of this invention will become amply apparent when considered in connection with the accompanying drawings, in which:

FIGURE 1 illustrates a side elevational view of a duo-servo brake having an automatic adjuster and incorporating the present invention;

FIGURE 2 is a sectional view taken along section line 2—2 of FIGURE 1;

Figure 3:
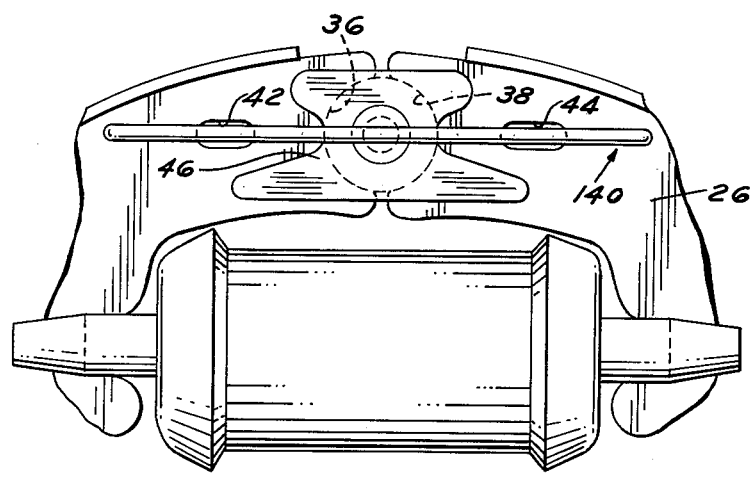
FIGURE 3 is an elevational view illustrating an alternate embodiment of the invention.

Referring now to the drawings, wherein like reference numerals identify like parts throughout the various illustrated embodiments, FIGURE 1 discloses a brake assembly of the internal shoe type. The assembly of FIGURE 1 includes a brake backing plate 10 having a primary brake shoe 12 and a secondary brake shoe 14 movably secured thereto by steady rest springs 16 and 18. A rugged anchor pin 20 is rigidly affixed to the backing plate 10 at the location illustrated in the drawing. A brake drum 22 surrounds the brake shoes 12, 14 in spaced relation and is adapted to be connected to a rotatable wheel. The drum 22 is engageable by the shoes 12, 14 for stopping purposes in the usual fashion.

The brake shoes 12 and 14 are of conventional construction having web portions 24 and 26 to which semi-cylindrical rims 28 and 30 are welded. The rims 28, 30 have arcuate brake linings 32 and 34 riveted thereto. The linings 32, 34 frictionally contact the inner surface of the drum 22 when the brake assembly is actuated. The adjacent upper ends of the brake shoe webs 24, 26 are provided with notches 36 and 38 that engage the anchor pin 20. A unique retractor spring 40, which will be described in greater detail later, extends between elongated holes 42 and 44 provided in the upper ends of the webs 24, 26 to hold the notches 36, 38 in engagement with the anchor pin 20.

As disclosed in FIGURE 2, a keeper plate 46 is secured to the anchor pin 20 by a peening process that offsets the protruding outer end of the pin. The plate 46 prevents the notched ends 36, 38 from slipping off of the anchor pin 20. A hydraulic wheel cylinder 48 is secured to the backing plate 10 and has extendable struts 50 and 52 that engage the shoe webs 24, 26. The hydraulic cylinder 48 is actuatable to force the shoes 12, 14 outwardly against the drum 22 in a conventional manner.

A threaded extendable link 54 is interposed between the lower ends of the shoe webs 24, 26. The link 54 includes a star wheel 56 that may be rotated to increase the spread between the adjacent ends of the shoes 12, 14. In a conventional brake, this adjustment is performed by inserting a screw driver through a hole in the backing plate that is in alignment with the star wheel 56. The screw driver is used to advance the star wheel an amount required to compensate for brake lining wear.

A cable 58 has its upper end hooked to the anchor pin 20 by an eye fitting 60. A guide 62 is secured to the web 26 of the secondary brake shoe 14 and slideably receives the cable 58. The lower end of the cable 58 connects with an actuating lever 64.

The lever 64 has a generally triangular shape. One corner 66 of the triangle pivotally engages the web 24 of secondary shoe 14 and that point constitutes a fulcrum. The second corner 68 of the triangular lever 64 engages the star wheel 56. The third corner 70 is connected to the lower end of the cable 58 and also receives one end of a spring 72. Spring 72 has its opposite end 74 hooked onto the lower portion of the primary shoe web 24.

Briefly, the present construction provides an arrangement in which adjustment of the brake is initiated when the notched end 38 of the secondary shoe 14 is moved away from the anchor pin 20 and the cable 58 is, in effect, foreshortened so that corner 68 of the actuating lever clicks past one of the serrations on the star wheel 56. When the brake is returned to a static condition, spring 72 will cause the lever 64 to advance the star wheel 56 in a direction to increase the spread between the lower ends of the shoes 12, 14 and thus, effect a brake adjustment by compensating for brake lining wear.

Whether the secondary shoe 14 moves a sufficient distance from the anchor pin 20 to cause the lever 64 to click past one of the serrations on the star wheel 56 will be determined by the clearance between the brake drums 22 and the brake linings 32, 34. If the linings have been worn and the clearance is excessive, the adjustment will be automatically performed.

It is desired that the adjustment be made only during reverse rotation of the brake drum 22 when operation of the brake is usually not so severe. During panic stops at high speed, sufficient heat will be generated to expand the drum 22 and the adjusting device will sense a false clearance between the linings 32, 34 and the drum 22 if it were able to function during normal forward rotation. In order to provide the proper sequence of operation (i.e. the secondary shoe 14 is held against the anchor pin 20 except during reverse braking), the springs holding the primary shoe 12 must exert less force than the springs holding the secondary shoe 14. With a differential in forces, operation of the hydraulic wheel cylinder 48 will always cause the primary shoe 12 to leave the anchor pin 20 first.

According to the present invention, an improved arrangement is provided for supporting the brake shoes against the anchor pin and insuring that the primary shoe is held by a lesser force than the secondary shoe. According to the present invention, a pair of elongated holes 42, 44 is provided in the upper ends of the primary and secondary shoe webs 24, 26 adjacent to the anchor pin 20 and in alignment therewith. A unique spring 40 draws the notched ends 36, 38 into contact with the anchor pin 20. The spring 40 has a three-dimensional construction with an elongated C-shaped body portion 74 as viewed in FIGURE 1. The body portion 74 lies in a plane parallel to the planes of the webs 24, 26 and the backing plate 10. Integral hook-shaped ends 76 extend generally perpendicular from the body portion 74 and engage the slots 42, 44.

This unique spring configuration has certain unusual characteristics and provides an improved combination when installed in a duo-servo brake replacing the conventional coil type retractor springs. The sole purpose for the retractor springs is to pull the brake shoe ends into engagement with the anchor pin. The spring 40 of the present invention applies a spring force between the shoe ends 36, 38 in direct alignment with the anchor pin 20. The spring does not contact the anchor pin. Thus, the spring applies its forces solely where it is needed and does not create additional forces that are undersirable. For example, in prior art constructions an undesriable force couple is created by hooking the retractor springs between the anchor pin and a midpoint on the brake shoe webs. This couple tends to lift the brake shoe off of the backing plate. Because the spring 40 applies its forces solely to the ends of the shoes 12, 14 the forces exerted by the spring 28 on the shoes are equal.

In the duo-servo brakes having an automatic adjuster, as illustrated in FIGURE 1, the spring 72 exerts a force on the secondary shoe 14 acting through the cable 58. This spring force provides a differential so that the primary shoe 12 will always move away from the anchor pin 20 first when the hydraulic wheel cylinder 48 is actuated.

Spring 40 provides a unique load versus deflection curve that is particularly desirable for its application as a retractor spring. Unlike the coil spring whose deflection is directly proportional to the load interposed, spring 40 has a curve similar to that of a Belleville washer. High initial load is required for initial deflection. Once initially loaded, the curve flattens so that small additional loads will produce an increased deflection. Thus, in the range of movement encountered in a brake of the type described, applicant's spring 40 exerts a reasonably constant load.

When the spring 40 is loaded, it will deflect or deform by attempting to straighten the various curved portions. The bent ends of the body portion 74 will tend to straighten out. The curve portions that connect the hooked ends 76 with the body portion 74 will also tend to straighten out. The straight portion of the body 74 which interconnects the curved ends will be deflected accordingly.

Figure 4:
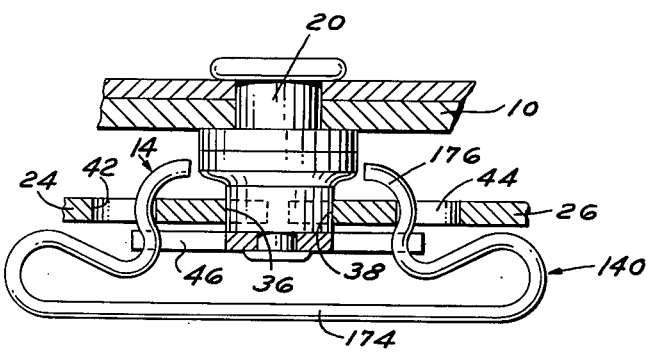
FIGURE 4 is a sectional view taken along section line 4—4 of FIGURE 3.

An alternate form of the invention is illustrated in FIGURES 3 and 4. Its construction and operation is substantially the same as that of FIGURES 1 and 2. In this embodiment, the spring 140 lies in a single plane with the hooked ends 176 being coplanar with the enlarged ends of the body portion 174. The embodiment is shown in connection with a duo-servo brake of the nonautomatic adjuster type.

In addition to their functional advantages, the two embodiments of the invention are further characterized by their inexpensive manufacture and compactness.

The principal advantages of applicant's invention, when embodied in a duo-servo brake having an automatic brake adjuster, is improved operation resulting from a proper balance of spring forces. In both the automatic adjuster and manual adjuster type, duo-servo brake performance is improved because the spring forces are applied in alignment with the anchor pin and there are no undesirable forces present. Applicant's unique spring is of simple design and is easy to manufacture. Economies are realized by using it in place of conventional coil springs.

The foregoing description presents the presently preferred embodiment of this invention. Modifications and alterations may occur to those skilled in the art that will come within the scope and spirit of the following claims.

1. A brake construction comprising a backing plate, a pair of arcuate brake shoes movably connected to said backing plate and having juxtaposed upper and lower ends, an anchor pin secured to said backing plate and interposed between said upper ends, said upper ends having a pair of holes in alignment with said anchor pin, a wire spring having hooked ends engaging the edges of said holes, said spring having a uniplanar generally C-shaped body portion, said hooked ends being formed integral with said body portion and lying in the plane of said body portion, said spring exerting a holding force on said shoes in direct alignment with said pin.

2. A brake construction comprising a backing plate, a pair of arcuate brake shoes movably connected to said backing plate and having juxtaposed upper and lower ends, an anchor pin secured to said backing plate and interposed between said upper ends, said upper ends having a pair of holes in alignment with said anchor pin, a wire spring having hooked ends engaging the edges of said holes, said spring having a uniplanar generally C-shaped body portion, said hooked ends being formed integral with said body portion and lying in a plane perpendicular to the plane of said body portion, said spring exerting a holding force on said shoes in direct alignment with said pin.

3. A brake construction comprising a backing plate, a pair of arcuate brake shoes movably connected to said backing plate and having juxtaposed upper and lower ends, an anchor pin secured to said backing plate and interposed between said upper ends, said upper ends having a pair of holes in alignment with said anchor pin, a wire spring having hooked ends engaging the edges of said holes, said spring having a uniplanar generally C-shaped body portion, said hooked ends being formed integral with said body portion, said spring exerting a holding force on said shoes in direct alignment with said pin.

4. A brake construction comprising a backing plate, a pair of arcuate brake shoes movably connected to said backing plate and having juxtaposed upper and lower ends, an anchor pin secured to said backing plate and interposed between said upper ends, an extendable link interconnecting said lower ends, automatic adjuster means engaging said anchor pin, one of said shoes and said link and adapted to extend said link when said one shoe is moved away from said anchor pin a given distance, said upper ends having a pair of holes in alignment with said anchor pin, a wire spring having hooked ends engaging the edges of said holes, said spring having a uniplanar generally C-shaped body portion, said hooked ends being formed integral with said body portion and lying in a plane perpendicular to the plane of said body portion, said spring exerting a holding force on said shoes in direct alignment with said pin.

5. A brake construction comprising a backing plate, a pair of arcuate brake shoes movably connected to said backing plate and having juxtaposed upper and lower ends, an anchor pin secured to said backing plate and interposed between said upper ends, an extendable link interconnecting said lower ends, automatic adjuster means engaging said anchor pin, one of said shoes and said link and adapted to extend said link when said one shoe is moved away from said anchor pin a given distance, said upper ends having a pair of holes in alignment with said anchor pin, a wire spring having hooked ends engaging the edges of said holes, said spring having a uniplanar generally C-shaped body portion, said hooked ends being formed integral with said body portion and lying in the plane of said body portion, said spring exerting a holding force on said shoes in direct alignment with said pin.

6. A brake construction comprising a backing plate, a pair of arcuate brake shoes movably connected to said backing plate and having juxtaposed upper and lower ends, an anchor pin secured to said backing plate and interposed between said upper ends, an extendable link interconnecting said lower ends, automatic adjuster means engaging said anchor pin, one of said shoes and said link and adapted to extend said link when said one shoe is moved away from said anchor pin a given distance, said upper ends having a pair of holes in alignment with said anchor pin, a wire spring having hooked ends engaging the edges of said holes, said spring having a uniplanar generally C-shaped body portion, said hooked ends being formed integral with said body portion, said spring exerting a holding force on said shoes in direct alignment with said pin.

7. A brake construction comprising a backing plate, a pair of arcuate brake shoes movably connected to said backing plate and adapted to engage a rotatable brake drum, said shoes each comprising an arcuate reinforcing web adapted to lie in a plane parallel to the plane of rotation of said drum, said webs having a pair of juxtaposed ends, a reaction member interposed between said ends, said ends each having a hole, said holes being in alignment with said reaction member, a wire spring having hooked ends engaging the edges of said holes, said spring having a uniplanar generally C-shaped body portion, the plane of said body portion being parallel to the plane of said webs, said hooked ends being formed integral with said body portion and extending generally perpendicular to the plane of said webs, said spring exerting a holding force on said shoes in direct alignment with said reaction member.

8. A brake construction comprising a backing plate, a pair of arcuate brake shoes movably connected to said backing plate and adapted to engage a rotatable brake drum, said shoes each comprising an arcuate reinforcing web adapted to lie in a plane parallel to the plane of rotation of said drum, said webs having a pair of juxtaposed ends, a reaction member interposed between said ends, said ends each having a hole and said holes being in alignment with said reaction member, a wire spring having hooked ends engaging the edges of said holes, said spring having a uniplanar generally C-shaped body portion, the plane of said body portion being perpendicular to the plane of said webs, said hooked ends being formed integral with said body portion and extending generally perpendicular to the plane of said webs, said spring exerting a holding force on said shoes in direct alignment with said reaction member.

9. A brake construction comprising a backing plate, a pair of arcuate brake shoes movably connected to said backing plate and adapted to engage a rotatable brake drum, said shoes each comprising an arcuate reinforcing web adapted to lie in a plane parallel to the plane of rotation of said drum, said webs having a pair of juxtaposed ends, a reaction member interposed between said ends, said ends each having a hole, said holes being in alignment with said reaction member, a wire spring having hooked ends engaging the edges of said holes, said spring having a uniplanar generally C-shaped body portion, said hooked ends being formed integral with said body portion and extending generally perpendicular to the plane of said webs, said spring exerting a holding force on said shoes in direct alignment with said reaction member.

10. A brake construction comprising a backing plate, a pair of arcuate brake shoes movably connected to said backing plate, said shoes each having a flat reinforcing web lying in a common plate, said webs having a pair of juxtaposed ends, a reaction member interposed between said ends, said ends each having a hole, said holes being in alignment with said reaction member, a wire spring having ends engaging the edges of said holes and straddling said reaction member, said spring having a uniplanar body portion, said ends being formed integral with said body portion and extending generally perpendicular to the plane of said webs, said spring exerting a holding force on said shoes in direct alignment with said reaction member.

11. A brake construction comprising a backing plate, a pair of arcuate brake shoes movably connected to said backing plate, said shoes each having a flat arcuate reinforcing web located in a common plate, said webs having a pair of juxtaposed ends, an anchor pin interposed between said ends, said ends each having a hole, said holes being in alignment with said anchor pin, a wire spring having hooked ends engaging the edges of said holes and straddling said anchor pin, said spring having a uniplanar generally C-shaped body portion, said hooked ends being formed integral with said body portion and extending generally perpendicular to the plane of said webs, said spring exerting a holding force on said shoes in direct alignment with said reaction member.

References Cited by the Examiner

UNITED STATES PATENTS

| | | | |
|---|---|---|---|
| 2,938,610 | 5/60 | Dombeck et al. | 188—79.5 |
| 3,016,990 | 1/62 | Towns | 182—216 X |
| 3,095,950 | 7/63 | Scheel | 182—216 X |

ARTHUR L. LA POINT, *Primary Examiner.*

DUANE A. REGER, *Examiner.*